(12) United States Patent
Park et al.

(10) Patent No.: US 8,625,037 B2
(45) Date of Patent: Jan. 7, 2014

(54) STEREOSCOPIC IMAGE DISPLAY DEVICE

(75) Inventors: Sang-Hun Park, Gyeongbuk (KR); Joun-Ho Lee, Daegu (KR); Jong-Hyuck Lee, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 314 days.

(21) Appl. No.: 13/157,544

(22) Filed: Jun. 10, 2011

(65) Prior Publication Data
US 2011/0304783 A1 Dec. 15, 2011

(30) Foreign Application Priority Data

Jun. 11, 2010 (KR) .................. 10-2010-0055652

(51) Int. Cl.
*G02F 1/1335* (2006.01)
(52) U.S. Cl.
USPC ............................ 349/15; 349/200
(58) Field of Classification Search
None
See application file for complete search history.

(56) References Cited

U.S. PATENT DOCUMENTS

| 2007/0008406 A1 | 1/2007 | Shestak et al. |
| 2008/0204874 A1 | 8/2008 | Kim et al. |
| 2009/0015737 A1* | 1/2009 | Jung et al. ............ 349/15 |

FOREIGN PATENT DOCUMENTS

| CN | 1916692 A | 2/2007 |
| CN | 101257639 A | 9/2008 |
| CN | 101344698 A | 1/2009 |
| CN | 101477278 A | 7/2009 |

OTHER PUBLICATIONS

Chinese Office Action for Chinese Patent Application No. 201110155579.5 dated Jul. 24, 2013.

* cited by examiner

*Primary Examiner* — Sarah Hahm
(74) *Attorney, Agent, or Firm* — Morgan, Lewis & Bockius LLP

(57) ABSTRACT

The present invention relates to stereoscopic image display device which can compensate mismatch of bonding between a switchable panel and a liquid crystal panel.

The stereoscopic image display device includes a liquid crystal panel for forwarding a 2D image, a switchable panel formed on the liquid crystal panel to have n (where n is 2 or greater than 2) first electrodes in correspondence to one switchable region for forwarding the 2D image in a 3D image upon application of a voltage thereto, and a voltage generating unit having n voltage sources for applying voltages to the n first electrodes, independently.

9 Claims, 7 Drawing Sheets

STEREOSCOPIC IMAGE DISPLAY DEVICE

CROSS REFERENCE TO RELATED APPLICATION

This application claims the benefit of the Patent Korean Application No. 10-2010-0055652, filed on Jun. 11, 2010, which is hereby incorporated by reference as if fully set forth herein.

BACKGROUND OF THE DISCLOSURE

1. Field of the Disclosure

The present invention relates to stereoscopic image display devices, and more particularly, to a stereoscopic image display device in which align marks of a switchable panel and a liquid crystal panel sense bonding mismatch between the switchable panel and the liquid crystal panel to compensate the mismatch even if the mismatch takes place, for reducing cross talk and compensating a watching position.

2. Discussion of the Related Art

It is foreseen that services to be realized by fast information transmission to be constructed based on a super-highway information network will be developed from the present mere 「Hearing and Speaking」 services like telephone services to 「Watching and Hearing」 multimedia services centered on digital terminals in which characters, voices and images are processed at a high speed, and at the end, to a super-spatial realistic 3D stereoscopic information communication services in which 「See, Feel, and Enjoying realistically and stereoscopically standing aloof from time and space」.

In general, the stereoscopic image which expresses three dimensions is made by a principle of a stereoscopic view angle through the two eyes in which a left eye and a right eye see images slightly different from each other owing to a difference of positions of the two eyes as the two eyes have a difference of views, i.e., the two eyes are about 65 mm spaced from each other. The difference of images caused by the difference of positions of the two eyes is called as binocular disparity. A three dimensional stereoscopic display device makes a user to have a stereoscopic feeling owing to the binocular disparity by making the left eye to see an image only on the left eye and the right eye to see an image only on the right eye by utilizing the binocular disparity.

That is, the left/right eyes are made to see two dimensional images different from each other respectively, and if the two images are transmitted to a brain through retinas, the brain combines the two images accurately to produce a sense of depth and a sense of reality of an original three dimensional image. Such a capability is in general called as stereography, and a device having the stereography applied thereto is called as the stereoscopic display device.

In the meantime, in types for producing the 3D image in the stereoscopic display devices, there are a goggle type and non-goggle type depending on presence of the goggle.

And, in the non-goggle type, there are parallax barrier type and lenticular type depending on a shape of a structure for producing the stereoscopic image. The parallax barrier type or lenticular type stereoscopic image display device has a 3D panel mounted on the liquid crystal panel for converting a 2D image from the liquid crystal panel to the 3D image.

The parallax barrier type 3D panel is provided with a barrier filter for displaying the stereoscopic image therethrough, and the lenticular type 3D panel has a semi-cylindrical lenticular screen attached thereto for producing the stereoscopic image.

In the meantime, if the liquid crystal panel and the 3D panel fail to be bonded exactly, a watching position does not fall on a center, but is leaned to a left or right side of the stereoscopic image display device, to increase the cross talk increases, and a defect ratio of the stereoscopic image display device.

SUMMARY OF THE DISCLOSURE

Accordingly, the present invention is directed to a stereoscopic image display device.

An object of the present invention is to provide a stereoscopic image display device in which align mark of a switchable panel and a liquid crystal panel sense bond mismatch between a switchable panel and a liquid crystal panel to compensate the mismatch even if the mismatch takes place, for a user to watch a stereoscopic image.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic image display device includes a liquid crystal panel for forwarding a 2D image, a switchable panel formed on the liquid crystal panel to have n (where n is 2 or greater than 2) first electrodes in correspondence to one switchable region for forwarding the 2D image in a 3D image upon application of a voltage thereto, and a voltage generating unit having n voltage sources for applying voltages to the n first electrodes, independently.

The device further includes shift means for shifting an order of application of the voltages from the n voltage sources to the n first electrodes.

The switchable panel includes a first substrate having the n first electrodes, a second substrate having a second electrode, and a liquid crystal layer between the first and second substrates.

The n voltage sources are connected to the n first electrodes different from one another through n signal lines formed at an edge of the first substrate, respectively.

The shift means adjusts an extent of shift of the n voltages to be applied to the n first electrodes independently according to an extent of the mismatch of bonding if the mismatch of bonding between the switchable panel and the liquid crystal panel takes place.

The n voltage sources includes V1~Vn voltage sources, for applying voltages to the n first electrodes in an order to V1~Vn voltages initially and, after sensing the mismatch of bonding, in an order of Vm (Where m is 2 or greater than 2)~Vn~Vn−m.

The first substrate has a first align mark formed at an edge thereof, and the liquid crystal panel has a second align mark formed at a position matched to the first align mark.

The mismatch of bonding between the switchable panel and the liquid crystal panel is sensed by sensing an extent of mismatch between the first align mark and the second align mark.

If n voltages are applied to the n first electrodes in the switchable region in symmetry with respect to a center of the switchable lens such that the voltages become the higher as the voltages go from the center to an edge of the switchable lens the more, a parabolic potential surface is formed in the liquid crystal layer.

In order to make the switchable region to have a black region and a white region which divide the switchable region, voltages applied to the first electrodes which corresponds to the black region are different from voltages applied to the first electrodes which corresponds to the white region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

A switchable panel used in a stereoscopic image display device of the present invention will be described.

The switchable panel can serve as a switch such that the switchable panel can make 2D display when no voltage is applied thereto and can make 3D display when the voltage is applied thereto by utilizing a characteristic in which the switchable panel can transmit a light when no voltage is applied thereto.

In a non-goggle type stereoscopic image display device having the switchable panel, there are a parallax barrier type and a liquid crystal lens type.

The parallax barrier type stereoscopic image display device having the switchable panel has a liquid crystal layer to be divided into a black region and a white region according to an orientation of liquid crystal molecules upon application of voltages to the switchable panel at n lower electrodes thereof.

According to this, as the watcher perceives a 2D image forwarded from the liquid crystal panel through the white region in a 3D image, the watcher is made to watch a stereoscopic image.

And, the liquid crystal lens type stereoscopic image display device forms a parabolic potential surface upon application of the voltages to the switchable panel at n first electrodes to provide a lens effect.

According to this, as the watcher perceives the 2D image forwarded from the liquid crystal panel in the 3D image, the watcher is made to watch a stereoscopic image.

The stereoscopic image display device which can sense mismatch of bonding between the switchable panel and the liquid crystal panel will be described in detail.

Figure 1:
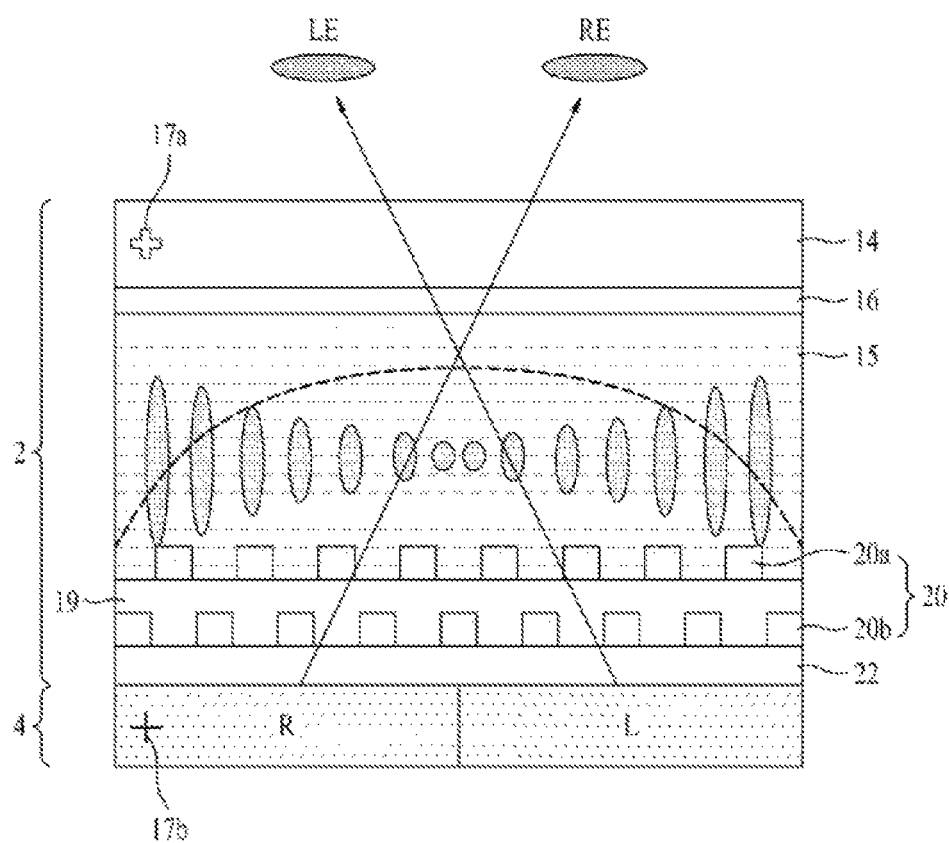
FIG. 1 illustrates a section of a liquid crystal lens type stereoscopic image display device which can sense mismatch of bonding between a switchable panel and a liquid crystal panel.

FIG. 1 illustrates a section of a liquid crystal lens type stereoscopic image display device which can sense mismatch of bonding between a switchable panel and a liquid crystal panel.

Referring to FIG. 1, the liquid crystal lens type stereoscopic image display device includes a liquid crystal panel 4 having a plurality of pixel regions for displaying an image, a switchable panel 2 having n first electrodes 20, and a backlight (not shown) under the liquid crystal panel 4 for directing a light to the liquid crystal panel.

Referring to FIG. 1, the liquid crystal panel 4 can be positioned under the switchable panel 2, or the liquid crystal panel 4 can be positioned on a front of the switchable panel 2.

The switchable panel 2 will be described in detail.

The switchable panel 2 includes opposite first and second substrates 22 and 14, n first electrodes 20 formed on the first substrate 22, a second electrode 16 formed on an entire surface of the second substrate 14, and a liquid crystal layer 15 between the first substrate 22 and the second substrate 14.

Referring to FIG. 1, the n first electrodes 20 can be arranged on layers different from one another or, depending on cases, arranged on a layer divided finely with an insulating film 19 formed between adjacent first electrodes.

Each of the n first electrodes 20 has a long bar shape.

And, first and second align marks 17a and 17b are formed on the second substrate 14 of the switchable panel 2 and on the liquid crystal panel 4, respectively.

The first align mark 17a is formed at an edge of the second substrate 14, and the second align mark 17b is formed on the liquid crystal panel 4 at a position matched to the first align mark 17a.

If the switchable panel 1 and the liquid crystal panel 4 are bonded, the liquid crystal panel 4 forwards the 2D image signal to the switchable panel 2, for the switchable panel 2 to forward the 3D image signal, thereby forwarding the 3D image or the 2D image selectively depending on application of the voltage to the stereoscopic image display device.

That is, the stereoscopic image display device displays the 2D image when no voltage is applied thereto by utilizing a characteristic of the switchable panel 2 in which the switchable panel 2 transmits the light when no voltage is applied thereto, and the 3D image when the voltage is applied thereto to serve as a switch.

Particularly, by detecting a state of alignment of the align marks 17a and 17b upon bonding the switchable panel 2 to the liquid crystal panel 4, mismatch of bonding can be sensed.

Figure 2:
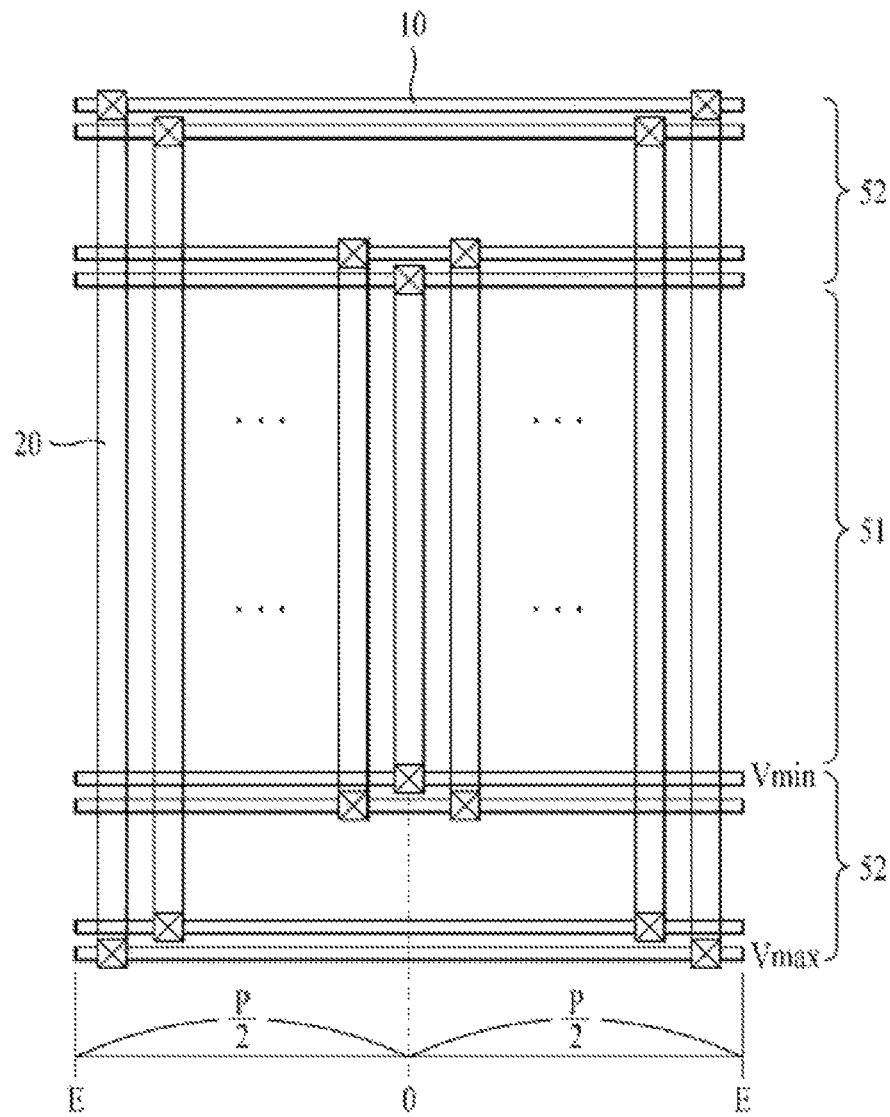
FIG. 2 illustrates a plan view showing connection between signal lines of a switchable panel and n first electrodes in the liquid crystal lens type stereoscopic image display device in FIG. 1.

FIG. 2 illustrates a plan view showing connection between signal lines of a switchable panel and n first electrodes in the liquid crystal lens type stereoscopic image display device in FIG. 1.

Referring to FIG. 2, the signal lines 10 are positioned at pad regions 52 on upper and lower sides of the active region 51 connected to the n first electrodes 20 for applying the voltage thereto.

The n first electrodes 20 have the voltages applied thereto in symmetry with respect to a center portion 0 up to edges E of a switchable region which has a width corresponding to one pitch P.

A Vmin is applied to the first electrode 20 at the center 0 of the switchable region, and a Vmax is applied to the first electrodes 20 at the both edge of switchable region, such that voltages which become the higher as the switchable region goes from the center to the edges the more are applied to the n first electrodes 20.

Therefore, upon application of the voltages to the n first electrodes 20 thus, the parabolic potential surface is formed in the liquid crystal layer (not shown), to provide a lens effect, optically.

Figure 3:
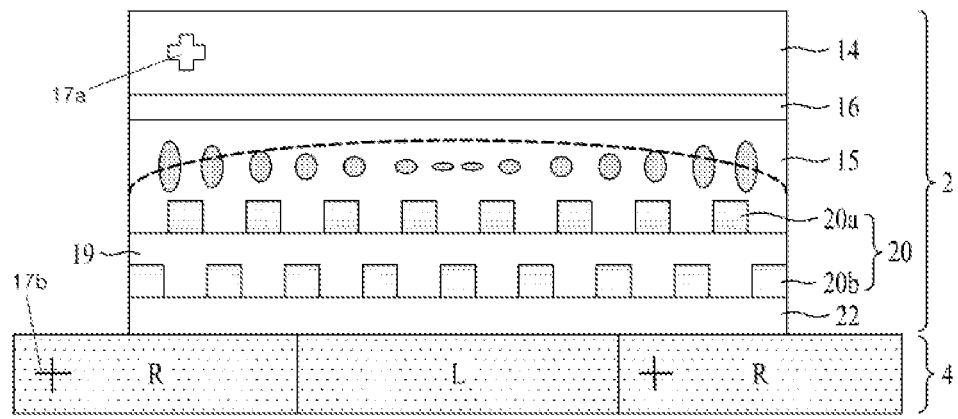
FIG. 3 illustrates a section showing mismatch of bonding between the switchable panel and the liquid crystal panel of the liquid crystal lens type stereoscopic image display device in FIG. 1.

FIG. 3 illustrates a section showing mismatch of bonding between the switchable panel and the liquid crystal panel of the liquid crystal lens type stereoscopic image display device in FIG. 1.

Referring to FIG. 3, if the switchable panel 102 and the liquid crystal panel 104 are bonded mismatched therebetween, the mismatch can be sensed from an extent of mismatch between the first and second align marks 117a and 117b.

In the meantime, even if there is the bonding mismatch taken place between the switchable panel 102 and the liquid crystal panel 104, the parabolic potential surface in the liquid crystal layer is not formed in conformity with left eye information L and right eye information R.

This is because the voltages are applied to the n first electrodes 20 in symmetry with respect to the center up to the edges of the switchable panel, and, since the signal lines 10 (See FIG. 2) are connected to the n first electrodes 20 not in an one to one matched fashion, the voltages to be applied to the n first electrodes 20 can not be changed, independently.

Accordingly, even if the mismatch of bonding between the switchable panel 102 and the liquid crystal panel 104 takes place, the stereoscopic image display device can not compensate the mismatch of bonding, resulting in the watching position of the watcher, not to be at the center, but to lean to a left or right side, thereby increasing cross talk and a defect ratio of the stereoscopic image display device.

A stereoscopic image display device in accordance with a first preferred embodiment of the present invention will be described, in which, at the time the mismatch of bonding between the switchable panel and the liquid crystal panel takes place upon application of voltages to the n first electrodes, the mismatch of the bonding is compensated by shifting the voltages applied to the n first electrodes according to an extent of the mismatch of the bonding.

Figure 4:
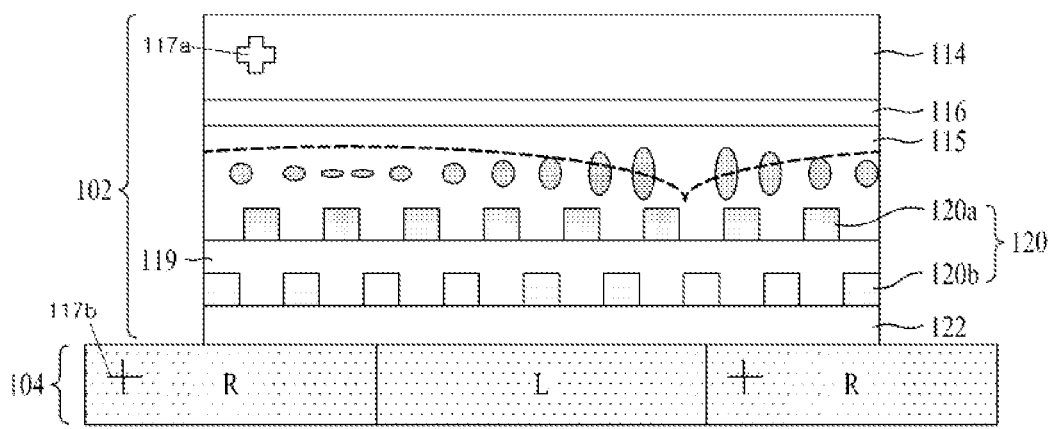
FIG. 4 illustrates a section of the liquid crystal lens type stereoscopic image display device in accordance with a first preferred embodiment of the present invention.

FIG. 4 illustrates a section of the liquid crystal lens type stereoscopic image display device in accordance with a first preferred embodiment of the present invention.

Even though the liquid crystal lens type stereoscopic image display device in accordance with a first preferred embodiment of the present invention has the switchable panel 102 and the liquid crystal panel 104 bonded mismatched therebetween, the parabolic potential surface in the liquid crystal layer 115 is shifted according to the extent of mismatch of the bonding to compensate for the mismatch of the bonding.

Sensing of the mismatch of the bonding is made by sensing an extent of mismatch of the first and second align marks 117a and 117b, wherein an observer observes the align marks 137a and 137b with a microscope to sense the extent of mismatch of the align marks 137a and 137b.

Then, an extent of shift of the voltages to be applied to the n first electrodes 120 are adjusted according to the extent of mismatch of the align marks for shifting the parabolic potential surface in the liquid crystal layer 115.

Referring to FIG. 4, the switchable panel 102 includes first and second substrates 122 and 114 opposite to each other, n first electrodes formed on the first substrate 122, a second electrode 116 formed on an entire surface of the second substrate 114, and a liquid crystal layer 115 between the first substrate 122 and the second substrate 114.

Figure 5:
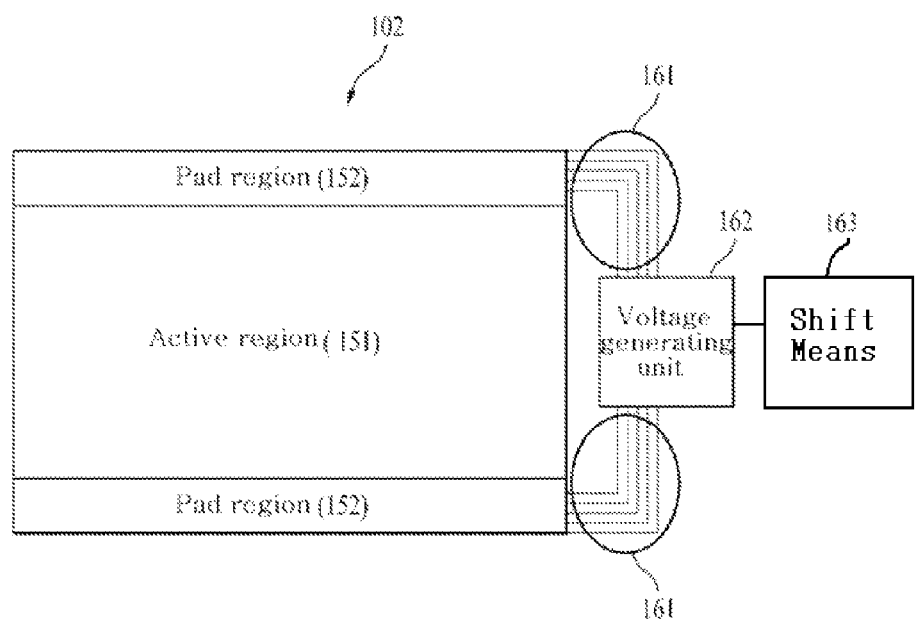
FIG. 5 illustrates a plan view showing a voltage application state of a switchable panel in accordance with a first preferred embodiment of the present invention.

In this instance, referring to FIG. 5, the n first electrodes 120 can be arranged on different layers dividing the n first electrodes, or depending on cases, on one layer dividing the n first electrodes finely with an insulating film 119 formed between adjacent first electrodes.

Each of the n first electrodes 120 has a long bar shape.

Referring to FIG. 4, the liquid crystal panel 104 can be positioned under the switchable panel 102, or on a front of the switchable panel 102 if necessary. And, if the liquid crystal panel 104 has a backlight (not shown) under the liquid crystal panel 104, and the stereoscopic image display device has a direct lighting type liquid crystal panel, the backlight (not shown) can be omitted.

The liquid crystal panel 104 forwards the 2D image information to the switchable panel 102, and can be a flat display device, such as a liquid crystal display device, an organic light emitting display device, a plasma display panel, and field emission display device.

When the switchable panel 102 and the liquid crystal panel 104 are bonded, the liquid crystal panel 104 forwards the 2D image signal to the switchable panel 102, and the switchable panel 102 receives the 2D image signal and forwards the 3D image signal, wherein the switchable panel 102 forwards the 2D image or the 3D image selectively depending on application of the voltages.

That is, by utilizing a characteristic of the switchable panel 102, in which the switchable panel 102 transmits the light when no voltages are applied thereto, the switchable panel 102 can display the 2D image when no voltages are applied thereto, and can display the 3D image when the voltages are applied thereto, functioning as a switch.

The n first electrodes 120 and the second electrode 116 are formed of a transparent metal, such as ITO (Indium Tin Oxide) and IZO (Indium Zinc Oxide), for preventing loss of transmissivity at portions the electrodes are positioned.

In this instance, the switchable panel 102 defines a switchable region including the n first electrodes.

One switchable region is defined to have a width corresponding to one pitch P. Switchable regions having the same pitches are repeated in one direction, periodically.

The switchable region is a region which has liquid crystals to be oriented according to voltages applied to the n first electrodes for providing a lens effect in view of a visual sense owing to differences of optical paths.

The liquid crystal panel 104 displays a left eye information L and a right eye information R for one switchable region, and at the time the left eye information L and the right eye information R is transmitted through the switchable panel 102, the watcher perceives the left eye information L at a left eye and the right eye information R at a right eye owing to a difference of effective refractive indices of each region of the switchable panel 102.

The perception is made owing to a distance between the left eye and the right eye a person has, i.e., a difference of views of the two eyes. In general, the two eyes of a person are about 65 mm spaced from each other in average. In this instance, a left eye region range is a range the left eye can perceive, and a right eye region range is a range the right eye can perceive, which ranges correspond to 65 mm respectively equivalent to the distance between the two eyes, and a distance including the right eye and the left eye region ranges is 130 mm which is two times of 65 mm.

Thus, by compensating the mismatch of the bonding between the switchable panel 102 and the liquid crystal panel 104, the cross talk can be reduced, and the watching position of the watcher can be compensated.

FIG. 5 illustrates a plan view showing a voltage application state of a switchable panel in accordance with a first preferred embodiment of the present invention.

Referring to FIG. 5, the switchable panel 102 includes an active region 151 on which display is made, and a pad region 152 for application and transmission of a voltage to n first electrodes 120 (See FIG. 4) and a second electrode 116 (See FIG. 4) formed on the active region 151.

And, the pad region 152 which applies a voltage signal from outside includes a voltage generating unit 162 having n voltage sources for independent application of the voltages to the n first electrodes 120 (See FIG. 4), shift means 163 for shifting an order of application of the voltages from the n voltage sources to the n first electrodes 120 (See FIG. 4), and a link portion 161 for connecting the voltage generating unit 162 to the pad region 152.

The voltage generating unit 162 can be formed in the pad region 152.

The n voltage sources having V1 to Vn voltage sources are connected to the n first electrodes 120 (See FIG. 4) through the n signal lines formed at an edge of the first substrate 122 (See FIG. 4).

And, if the mismatch of bonding between the switchable panel 102 (See FIG. 4) and the liquid crystal panel 104 (See FIG. 4) takes place, the shift means 163 adjusts an extent of shift of the n voltages to be applied to the n first electrodes 120 (See FIG. 4) independently according to the extent of the mismatch of bonding.

The shift means 163 can be provided to the switchable panel 102 (See FIG. 4) fabrication of which is finished or independently.

Figure 6:
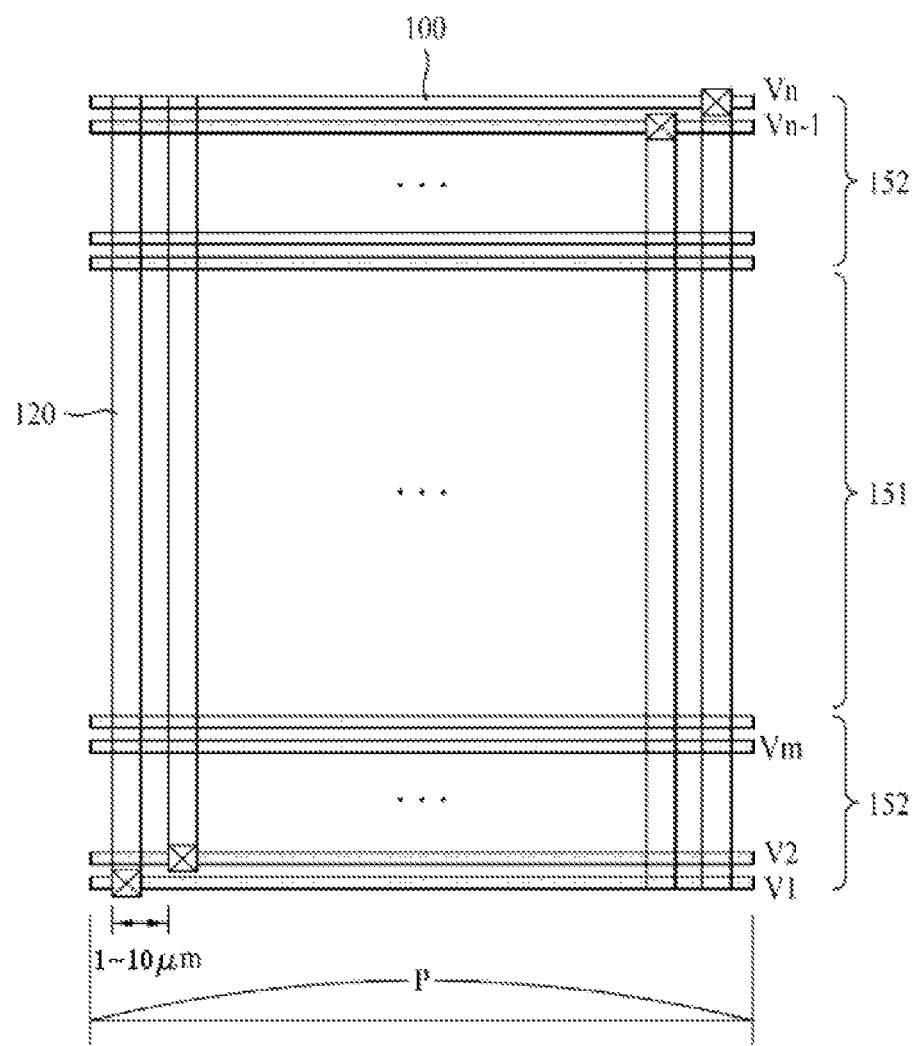
FIG. 6 illustrates a plan view showing connection between signal lines and n first electrodes in the switchable panel in FIG. 5.

FIG. 6 illustrates a plan view showing connection between the n signal lines and the n first electrodes in the switchable panel in FIG. 5.

Referring to FIG. 6, the n signal lines 100 are positioned at the pad region 152 positioned on an upper side and a lower side of the active region 151, and connected to the n first electrodes 120, respectively.

In this instance, the n signal lines 100 transmit voltages different from one another to the n first electrodes individually, and the n signal lines 100 are connected to the n first electrodes 120 in one to one matching fashion.

The n voltages sources having the V1~Vn voltage sources apply the voltages to the n first electrodes 120 in an order of V1~Vn.

Therefore, as the V1~Vn voltages are applied to the n first electrodes 120, the plurality of the first electrodes 120 are driven, individually.

Moreover, though not shown, the second electrode 116 (See FIG. 4) has another voltage applied thereto, and, in other switchable regions which are repetitive in a mode the same with the one switchable region, the plurality of first electrodes 120 are in contact with the signal lines 100 in the same fashion, too.

Figure 7:
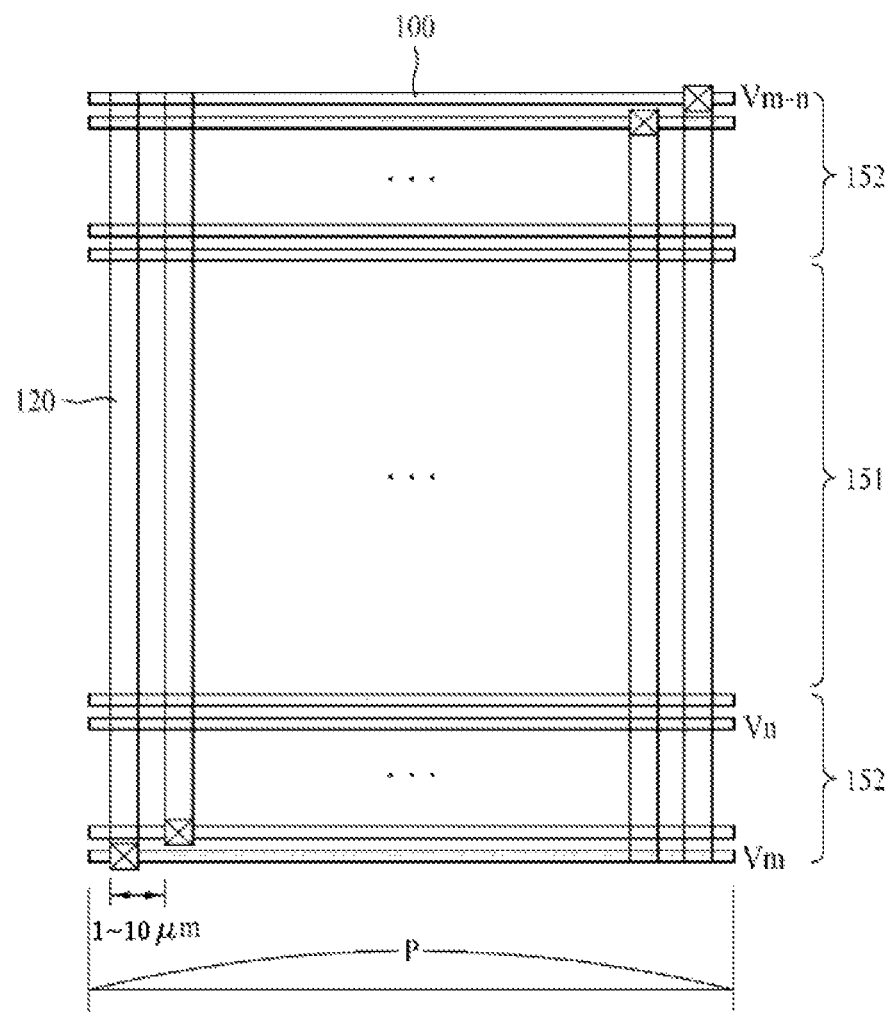
FIG. 7 illustrates a plan view showing connection between n signal lines and n first electrodes when mismatch of bonding between the switchable panel and the liquid crystal panel takes place.

FIG. 7 illustrates a plan view showing connection between the n signal lines and the n first electrodes when mismatch of bonding between the switchable panel and the liquid crystal panel takes place.

Referring to FIG. 7, if the mismatch of bonding between the switchable panel and the liquid crystal panel takes place, the extent of mismatch of the first and second align marks 117a and 117b is sensed to shift the voltages to be applied to the n first electrodes 120 according to the extent of the mismatch of bonding.

Alike FIG. 6, if the voltages are applied to the n first electrodes in an order to V1~Vn in a case no mismatch of bonding takes place, after sensing of the mismatch of bonding, the voltages are applied in an order of Vm (m is 2 or greater than 2)~Vn~Vn−m, and the shift means adjusts the extent of shift of the n voltages according to the extent of mismatch of bonding.

Therefore, if the mismatch of bonding between the switchable panel (not shown) and the liquid crystal panel (not shown) takes place, the voltages are applied to the n first electrodes 120 shifting the voltages according to the mismatch of bonding, making the parabolic potential surface formed in the liquid crystal layer 115 (FIG. 4) to shift, thereby compensating the mismatch of bonding.

Figure 8:
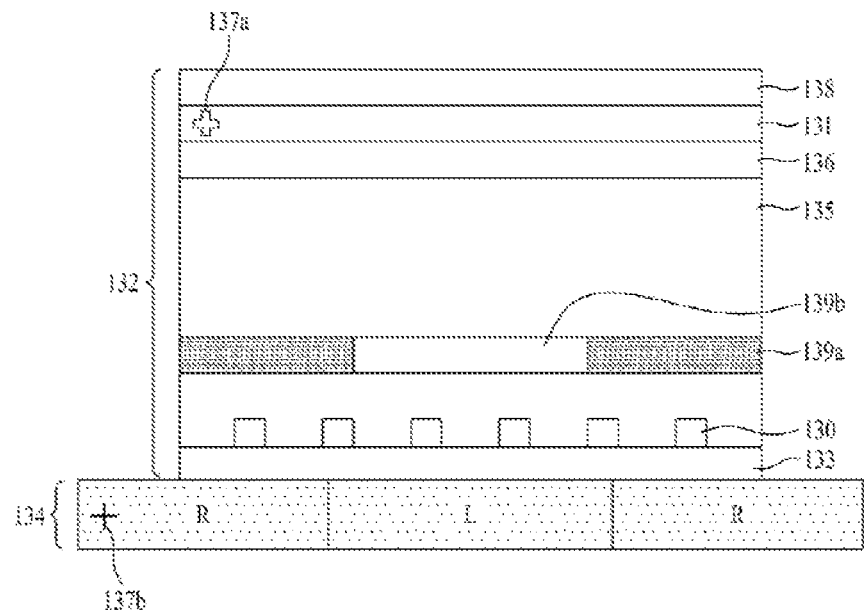
FIG. 8 illustrates a section of a parallax barrier type stereoscopic image display device having mismatch of bonding between the switchable panel and the liquid crystal panel taken place therein.

FIG. 8 illustrates a section of a parallax barrier type stereoscopic image display device having mismatch of bonding between the switchable panel and the liquid crystal panel taken place therein.

Referring to FIG. 8, there are a switchable panel 132 and a liquid crystal panel 134 bonded mismatched to each other.

The switchable panel 132 of the parallax barrier type stereoscopic image display device includes first and second substrates 133 and 131 opposite to each other, n lower electrodes 130 formed on the first substrate 133, an upper electrode 136 formed on an entire surface of the second substrate 131, and a liquid crystal layer 135 between the first substrate 133 and the second substrate 131.

If the switchable panel 132 is bonded to the liquid crystal panel 134, the liquid crystal panel 134 forwards a 2D image signal to the switchable panel 132, and the switchable panel 132 receives the 2D image signal and forwards a 3D image signal, for forwarding the 2D or the 3D image signal selectively depending on whether the voltage is applied or not.

The switchable panel 132 can serve as a switch such that the switchable panel can make 2D display when no voltage is applied thereto and can make 3D display when the voltage is applied thereto by utilizing a characteristic in which the switchable panel 132 can transmit a light when no voltage is applied thereto.

Upon application of the voltages to the n lower electrodes 130 of the switchable panel 132 at n lower electrodes thereof, the parallax barrier type stereoscopic image display device has a liquid crystal layer thereof divided into a black region 139a and a white region 139b according to an orientation of liquid crystal molecules.

According to this, as the watcher perceives the 2D image forwarded from the liquid crystal panel through the white region in the 3D image, the watcher is made to watch a stereoscopic image.

In the meantime, referring to FIG. 7, if the switchable panel 132 and the liquid crystal panel 134 are bonded mismatched to each other, the watching position of the watcher is not at the center, but leans to a left or right side, thereby increasing cross talk and a defect ratio of the stereoscopic image display device.

Figure 9:
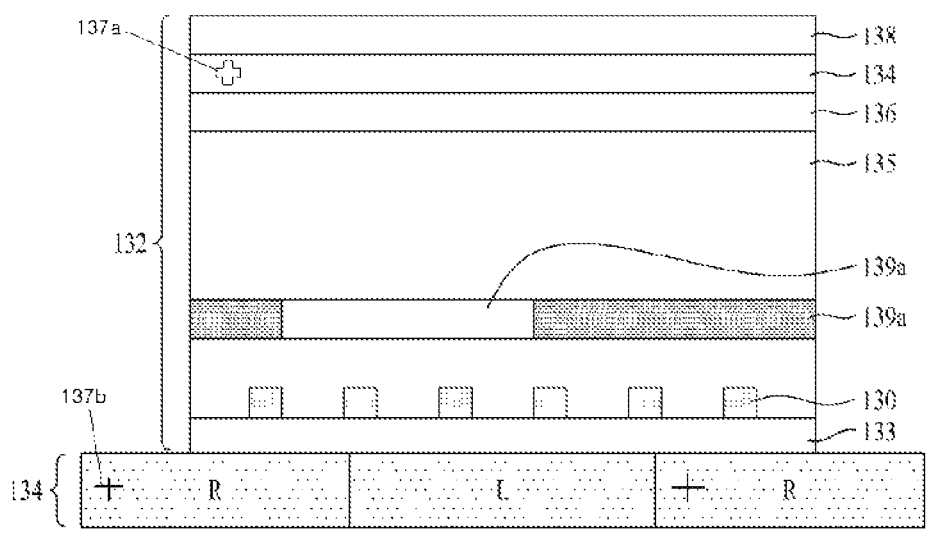
FIG. 9 illustrates a section of a parallax barrier type stereoscopic image display device in accordance with a second preferred embodiment of the present invention.

FIG. 9 illustrates a section of a parallax barrier type stereoscopic image display device in accordance with a second preferred embodiment of the present invention.

Referring to FIG. 9, if the mismatch of bonding between the switchable panel 132 and the liquid crystal panel 134 takes place, an extent of shift of the n voltages to be applied to the n first electrodes 130 independently is adjusted, to shift the black region 139a and the white region 139.

The adjustment of the extent of shift of the n voltages to be applied to the n first electrodes 130 independently is identical to the first embodiment of the present invention.

As has been described, the stereoscopic image display device of the present invention has the following advantages.

Since the align marks respectively formed on the second substrate of the switchable panel and the liquid crystal panel sense the mismatch of bonding between the switchable panel and liquid crystal panel, and, if the mismatch of bonding takes place, the stereoscopic image display device of the present invention can compensate for the mismatch of bonding by changing the voltages applied to the plurality of first electrodes according to the extent of mismatch as the voltages are applied to the plurality of first electrodes or the lower electrodes independently.

Thus, the watcher can watch the stereoscopic image, the cross talk can be reduced, and the watching position of the watcher can be compensated.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic image display device, comprising:
a liquid crystal panel for forwarding a 2D image;
a switchable panel formed on the liquid crystal panel to have n (where n is natural number more than 2) first electrodes in correspondence to one switchable region for forwarding the 2D image in a 3D image upon application of a voltage thereto;
a voltage generating unit having n voltage sources for applying voltages to the n first electrodes, independently; and
shift means for shifting an order of application of the voltages from the n voltage sources to the n first electrodes.

2. The device as claimed in claim 1, wherein the switchable panel includes:
a first substrate having the n first electrodes;
a second substrate having a second electrode; and
liquid crystal layer between the first and second substrates.

3. The device as claimed in claim 2, wherein the n voltage sources are connected to the n first electrodes different from one another through n signal lines formed at an edge of the first substrate, respectively.

4. The device as claimed in claim 2, wherein, if n voltages are applied to the n first electrodes in the switchable region in symmetry with respect to a center of the switchable lens such that the voltages become the higher as the voltages go from the center to an edge of the switchable lens the more, a parabolic potential surface is formed in the liquid crystal layer.

5. The device as claimed in claim 2, wherein, in order to make the switchable region to have a black region and a white region which divide the switchable region, voltages applied to the first electrodes which corresponds to the black region are different from voltages applied to the first electrodes which corresponds to the white region.

6. The device as claimed in claim 1, wherein the shift means adjusts an extent of shift of the n voltages to be applied to the n first electrodes independently according to an extent of a mismatch of bonding if the mismatch of bonding between the switchable panel and the liquid crystal panel takes place.

7. The device as claimed in claim 1, wherein the n voltage sources includes $V_1 \sim V_n$ voltage sources, for applying voltages to the n first electrodes in an order to $V_1 \sim V_n$ in voltages initially and, after sensing a mismatch of bonding, in an order of $V_m$ (where n is natural number more than 2)$\sim V_n \sim V_{n-m}$.

8. The device as claimed in claim 1, wherein the first substrate has a first align mark formed at an edge thereof, and the liquid crystal panel has a second align mark formed at a position matched to the first align mark.

9. The device as claimed in claim 8, wherein a mismatch of bonding between the switchable panel and the liquid crystal panel is sensed by sensing an extent of mismatch between the first align mark and the second align mark.

* * * * *